United States Patent
Ueno

[19]

[11] Patent Number: 5,834,036
[45] Date of Patent: Nov. 10, 1998

[54] SAFETY DEVICE FOR USE IN CLAMPING UNIT OF MOLDING MACHINE

[75] Inventor: Haruo Ueno, Nagano-ken, Japan

[73] Assignee: Nissei Plastic Industrial Co., Ltd, Nagano-ken, Japan

[21] Appl. No.: 944,692

[22] Filed: Oct. 6, 1997

[30] Foreign Application Priority Data

Oct. 9, 1996 [JP] Japan ................................ 8-268969

[51] Int. Cl.⁶ ............................................ B29C 45/84
[52] U.S. Cl. .................... 425/151; 425/152; 425/153; 425/DIG. 45
[58] Field of Search ................................ 425/151, 152, 425/153, DIG. 45

[56] References Cited

U.S. PATENT DOCUMENTS

| | | | |
|---|---|---|---|
| 3,386,133 | 6/1968 | Weiner | 425/DIG. 45 |
| 3,728,057 | 4/1973 | Grundmann et al. | 425/151 |
| 4,340,346 | 7/1982 | Hehl | 425/152 |
| 4,373,890 | 2/1983 | Hehl | 425/153 |

FOREIGN PATENT DOCUMENTS 6-45167  6/1994  Japan .

*Primary Examiner*—James P. Mackey
*Attorney, Agent, or Firm*—Weingarten, Schurgin, Gagnebin & Hayes LLP

[57] ABSTRACT

A safety device for use in a clamping unit of a molding machine is provided with an improved mechanism to always secure safety when the thickness of a mold is adjusted. The device comprises a safety rod having a predetermined number of engagement stepped portions and tapered surfaces formed alternately at a front end portion at predetermined intervals, a support block for supporting the safety rod, a lever member, a stopper engaged with the engagement stepped portion of the safety rod from sideways, and an operation member having a link bar arranged horizontally in such a manner that the link bar can swing freely and always located below the end portion of the lever member.

1 Claim, 3 Drawing Sheets

SAFETY DEVICE FOR USE IN CLAMPING UNIT OF MOLDING MACHINE

BACKGROUND OF THE INVENTION

1. Field of the Invention

This invention relates to a safety device for use in a clamping unit of a molding machine, which comprises a safety rod and a stopper.

2. Background Art

There is known a safety device in which a movable platen is inserted into a tie bar in such a manner that the movable platen can move back and forth between a fixed platen and a pressure receiving platen and a safety door is provided on a side portion of a mold opening/closing portion between the movable platen and the fixed platen in such a manner that the safety door can be opened and closed in a horizontal direction so that the movement of the movable platen is stopped by the engagement of a safety rod provided from the movable platen to the fixed platen or the pressure receiving platen with a stopper which is operated by the safety door when the safety door is opened.

When the safety device is provided from the movable platen to the pressure receiving platen and clamping is achieved by a toggle system, there is a safety problem that when the pressure receiving platen is moved to adjust the thickness of a mold, the operation position by the safety door is changed and the engagement between the safety rod and the stopper cannot be carried out at a predetermined location.

SUMMARY OF THE INVENTION

An object of the present invention is to provide a novel safety device for use in a clamping unit, which operates to secure safety regardless of a lever member due to the use of a link operation unit as the operation position by a safety door remains unchanged without being affected by the movement of a pressure receiving platen for the adjustment of the thickness of a mold even when clamping is carried out by a toggle system.

To attain the above object of the present invention, the safety device comprises a safety rod having a predetermined number of engagement stepped portions and tapered surfaces formed alternately at a front end portion at predetermined intervals with the tapered surfaces facing outward and extending to the pressure receiving platen with a rear end thereof fixed in a side portion of the movable platen; a support block, provided in a side portion of the pressure receiving platen, for supporting the safety rod; a lever member having a bent end portion disposed on the movable platen side and projecting outward and arranged horizontally above the safety rod in the support block in such a manner that the lever member can rotate freely; a stopper provided vertically at a rear end projecting outward of a bearing portion of the lever member and engaged with the engagement stepped portion of the safety rod from sideways; and an operation member attached to a guide frame of the safety door horizontally and having a link bar whose end portions are connected to a pair of link arms fixed to a seat plate movably by pins and which is arranged horizontally in such a manner that the link bar can swing freely and always located below the end portion of the lever member.

In the above configuration, since the location of the operation member is always fixed and the link bar extends in a horizontal direction, even when the stopper moves backward or forward together with the pressure receiving platen to adjust the thickness of a mold, the end portion of the lever member is always located above the link bar and even when the location of the lever member with respect to the link bar is changed, the link bar swings and is moved in a vertical direction while the upper edge line of the link bar is maintained horizontally. Therefore, an operation time change caused by a positional change does not occur. As a result, even when the thickness of a mold is adjusted, safety is always secured.

BRIEF DESCRIPTION OF THE DRAWINGS

The above and other objects and advantages of this invention will become clear from the following description with reference to the accompanying drawings, wherein.

DETAILED DESCRIPTION OF THE PREFERRED EMBODIMENTS

Figure 1:
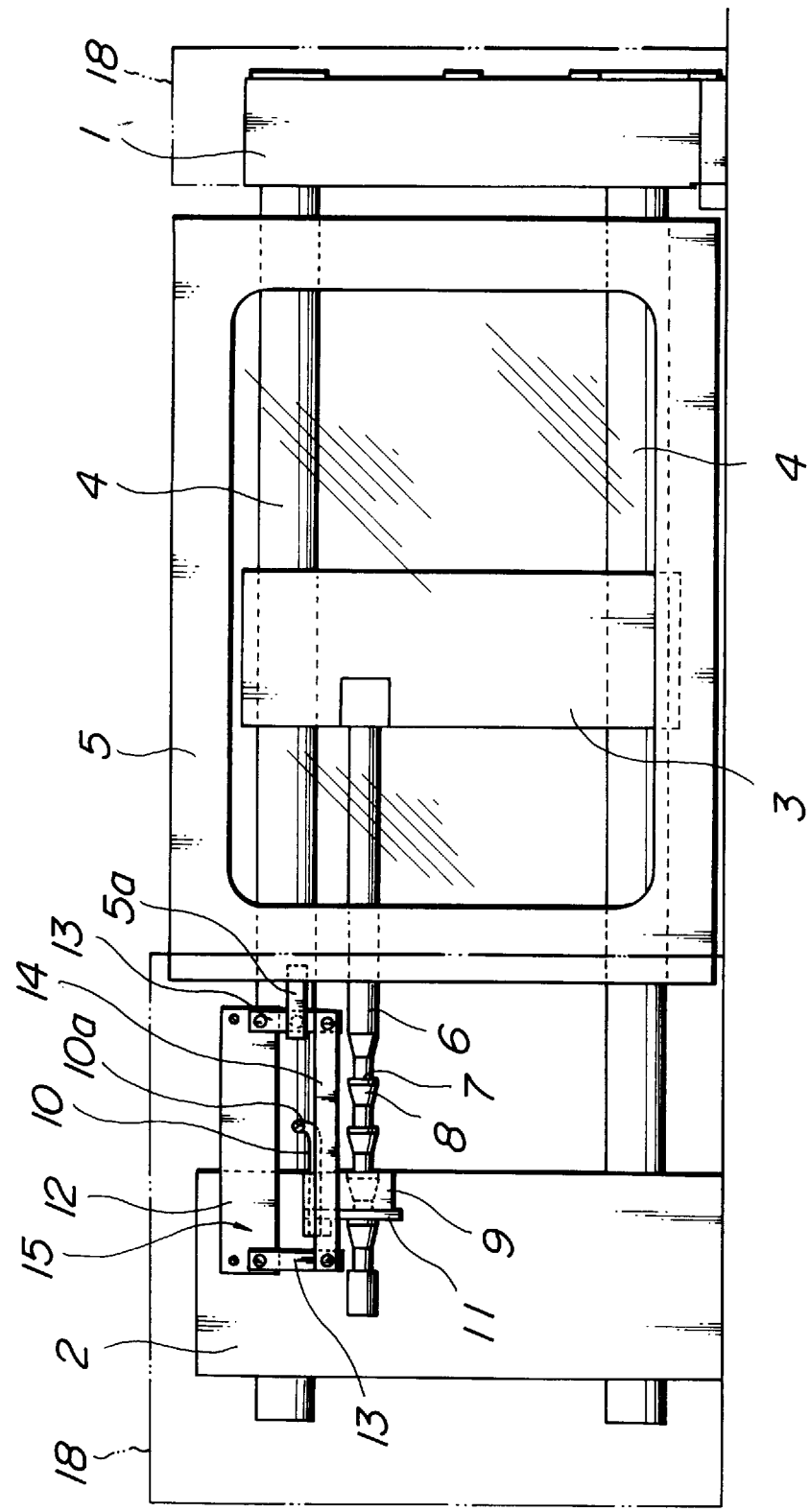
FIG. 1 is a schematic front view of a clamping unit for a molding machine equipped with the safety device of the present invention.
Figure 2:
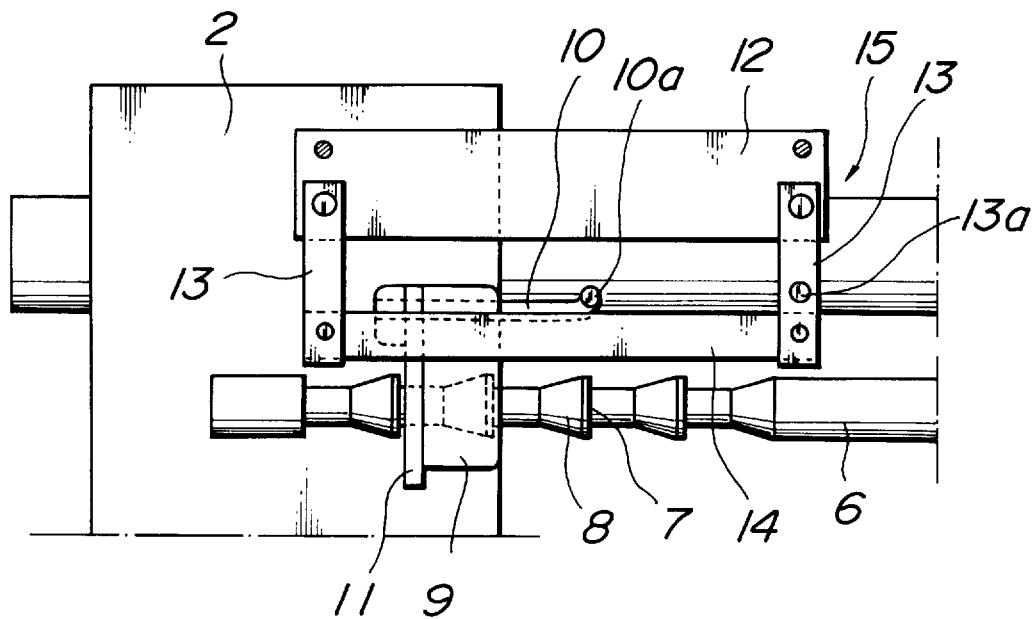
FIG. 2 is a front view of the safety device of the present invention when a stopper operates.
Figure 3:
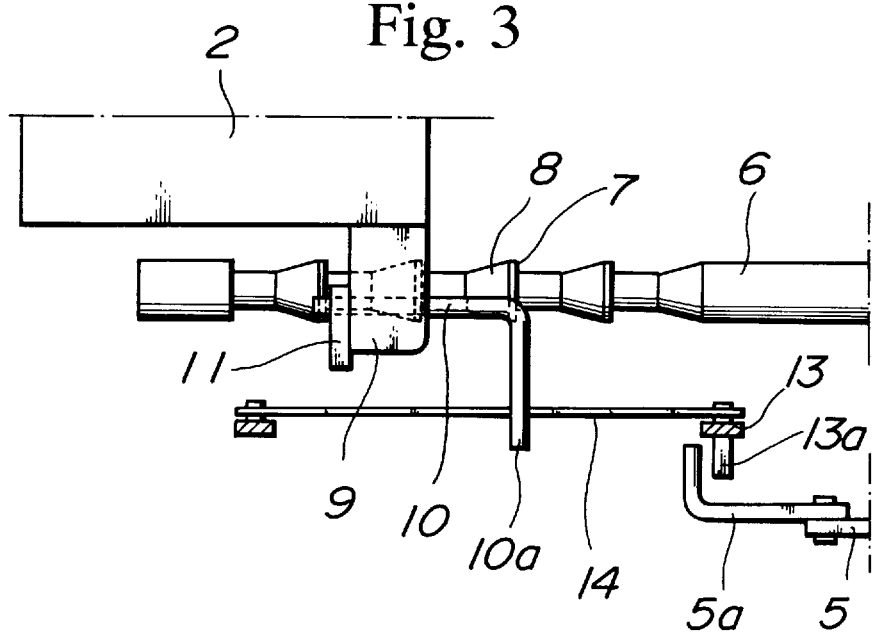
FIG. 3 is a sectional plane view of part of the safety device.
Figure 4:
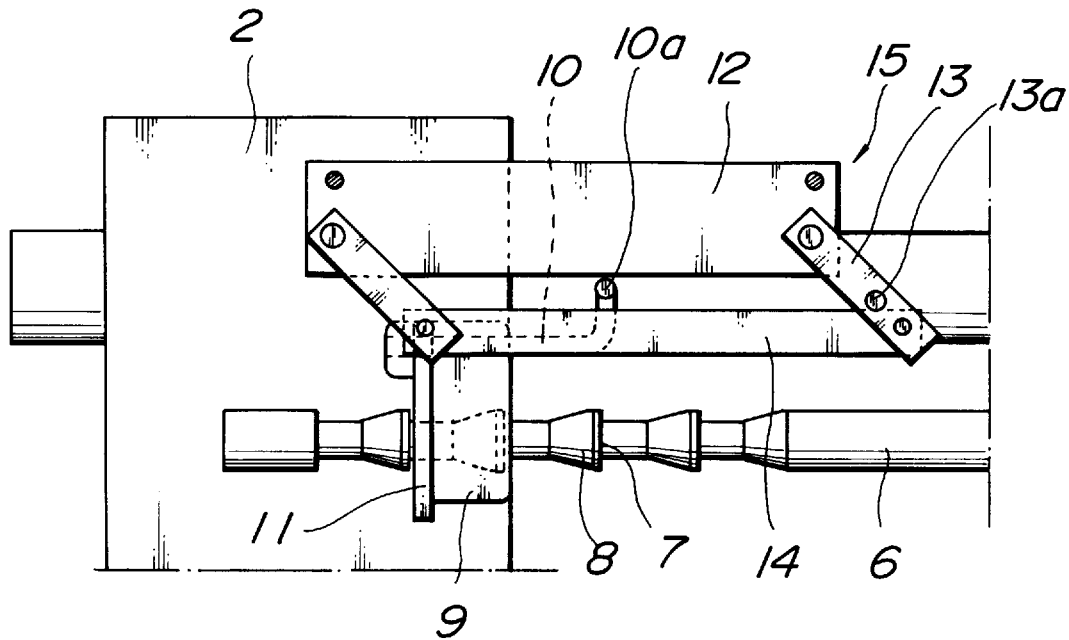
FIG. 4 is a front view of the safety device when the stopper is released.

In the accompanying drawings, reference numeral 1 denotes a fixed platen installed on a machine bed, numeral 2 denotes a pressure receiving platen provided on the machine bed in such a manner that the pressure receiving platen can move freely, and these platens are interconnected by tie bars 4. Reference numeral 3 represents a movable platen which is fitted with the tie bars 4 and moves freely between the fixed platen 1 and the pressure receiving platen 2, and an unshown toggle system for clamping is provided between the movable platen 3 and the pressure receiving platen 2. A safety door 5 is attached to a side portion of a mold opening/closing portion between the movable platen 3 and the fixed platen 1 in such a manner that the safety door is opened or closed freely in a horizontal direction.

Reference numeral 6 denotes a safety rod having a predetermined number of engagement stepped portions 7 and tapered surfaces 8 formed alternately at a front end portion thereof at predetermined intervals with the tapered surfaces 8 facing outward. This safety rod 6 is fixed in a side portion of the movable platen 3 at a rear end thereof and arranged horizontally to face a side portion of the pressure receiving platen 2. A support block 9 having a horizontal hole for receiving and supporting the safety rod 6 is formed in the side portion of the pressure receiving platen 2 and a lever member 10 for a stopper is inserted into an upper portion of the horizontal hole in the support block 9 in such a manner that it can rotate freely.

This lever member 10 is formed of an L-shaped round steel rod formed by bending an end portion 10a thereof and fitted in the support block 9 horizontally with the end portion 10a disposed on the movable platen 3 side and projecting outward in such a manner that the lever member can rotate freely. A plate-like stopper 11 to be engaged with one of the engagement stepped portions 7 of the safety rod 6 from sideways is attached to a rear end projecting outward of the support block 9 integrally in such a manner that the stopper 11 rotates together with the lever member 10.

Reference numeral 15 denotes an operation member for the lever member 10 which has a link bar 14 whose both end portions are connected by pins to a pair of parallel front and rear link arms 13, 13 which are fixed to a rectangular seat plate 12 at a predetermined interval such that the link arms can move freely in such a manner that the link bar can move freely. A tension pin 13a which can be engaged with an engagement piece 5a which is bent inward and projects from the rear end of the safety door 5 extends from the outer side surface of the front link arm 13.

Figure 5:
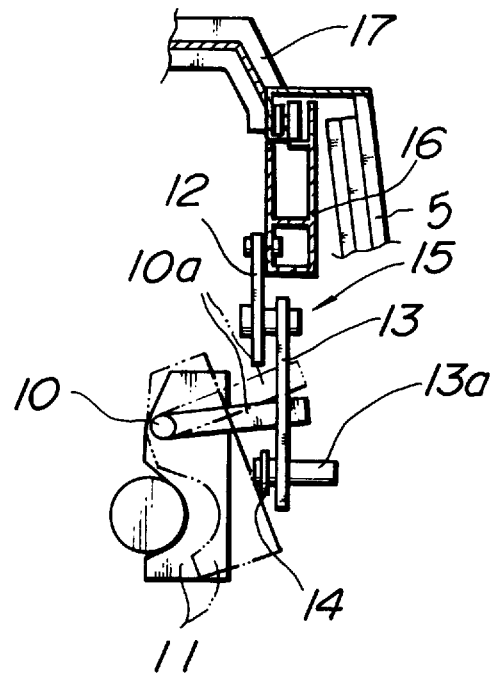
FIG. 5 is a schematic side view showing the attachment of an operation member and the working state of the stopper.

The seat plate 12 of the operation member 15 is fixed to an inner side of a guide frame 16 (abbreviated in FIG. 1, but shown in FIG. 5) of the safety door 5 horizontally so that the link bar 14 is always located below the end portion 10a of the lever member 10 and the operation member 15 can operate the stopper 11 together with the lever member 10 to move and displace when the link bar 14 swings and pushes up the lever end portion 10a by its upward movement. The guide frame 16 is installed horizontally in a peak portion of the upper cover 17 of the safety door 5 of the clamping unit.

In the above structure, when the pressure receiving platen 2 is moved forward or backward to adjust the thickness of a mold, the support block 9 moves together with the pressure receiving platen 2, whereby the lever member 10 and the stopper 11 also move. When this forward or backward movement is within the interval between the pair of link arms 13, 13, the end portion 10a of the lever member 10 is always located above the link bar 14. Therefore, the end portion 10a is moved upward by the swing movement of the link bar 14 to disengage the stopper 11 from the engagement stepped portion 7 of the safety rod 6, thereby enabling the forward or backward movement of the movable platen 3.

When the safety door 5 is opened, the engagement piece 5a is released from the tension pin 13a and the link bar 14 moves down to the original position by dead weight, whereby the end portion 10 which has been pushed up moves down by dead weight while moving the stopper 11 together with the lever member 10. Thereby, the stopper 11 is engaged with the engagement stepped portion 7 from sideways and serves to prevent the movement of the movable platen 3 together with the support block 9. Therefore, the clamping unit does not operate unless the link bar 14 is moved up by closing the safety door 4 again. Thus, safety is ensured.

While the presently preferred embodiment of the present invention has been shown and described, it will be understood that the present invention is not limited thereto, and that various changes and modifications may be made by those skilled in the art without departing from the scope of the invention as set forth in the appended claims.

What is claimed is:

1. A safety device for use in a clamping unit of a molding machine having a movable platen which is fitted with a tie bar and moves freely between a fixed platen and a pressure receiving platen and a safety door which is attached to a side portion of a mold opening/closing portion between the movable platen and the fixed platen such that it is opened or closed in a horizontal direction, wherein the safety device comprises:

a safety rod having a predetermined number of engagement stepped portions and tapered surfaces formed alternately at a front end portion at predetermined intervals with the tapered surfaces facing outward and extending to the pressure receiving platen with a rear end thereof fixed in a side portion of the movable platen;

a support block, provided in a side portion of the pressure receiving platen, for supporting the safety rod;

a lever member having a bent end portion disposed on the movable platen side and projecting outward and arranged horizontally above the safety rod in the support block in such a manner that the lever member can rotate freely;

a stopper provided vertically at a rear end projecting outward of a bearing portion of the lever member and engaged with the engagement stepped portion of the safety rod from sideways; and an operation member attached to a guide frame of the safety door horizontally and having a link bar whose end portions are connected to a pair of link arms fixed to a seat plate movably by pins and which is arranged horizontally in such a manner that the link bar can swing freely and always located below the end portion of the lever member.

* * * * *